United States Patent [19]

Quayle

[11] Patent Number: 5,755,847
[45] Date of Patent: May 26, 1998

[54] INSULATOR SUPPORT ASSEMBLY AND PUSHBAR MECHANISM FOR HANDLING GLASS CONTAINERS

[75] Inventor: David Quayle, Santa Fe Springs, Calif.

[73] Assignee: Pyrotek, Inc., Spokane, Wash.

[21] Appl. No.: 725,292

[22] Filed: Oct. 1, 1996

[51] Int. Cl.⁶ .................... C03B 9/453; B65G 47/82
[52] U.S. Cl. .................... 65/260; 65/239; 65/241; 65/375; 198/468.9; 198/598; 414/751
[58] Field of Search ............... 65/260, 241, 229, 65/165, 171, 172, 227, 239, 261, 323, 375; 198/468.01, 468.9, 468.1, 597, 598; 414/744.1, 744.2, 751

[56] References Cited

U.S. PATENT DOCUMENTS

| | | | |
|---|---|---|---|
| 4,466,532 | 8/1984 | Minneman et al. | 198/468.01 |
| 5,092,449 | 3/1992 | Bolin et al. | 65/260 |

Primary Examiner—Steven P. Griffin
Attorney, Agent, or Firm—Wells, St. John, Roberts, Gregory & Matkin, P.S.

[57] ABSTRACT

An insulator support assembly apparatus and process is provided, which includes a vertically oriented tubular frame with one or more insulator supports, one or more insulators and a pushbar mounting mechanism integral to the rearward frame support. Further provided is an insulated pushbar mechanism for moving glass containers which includes an insulator support assembly and a pushbar.

12 Claims, 7 Drawing Sheets

INSULATOR SUPPORT ASSEMBLY AND PUSHBAR MECHANISM FOR HANDLING GLASS CONTAINERS

TECHNICAL FIELD

This invention generally pertains to a new and improved insulator support assembly, for use in combination with a stacker bar, lehr bar, push bar or other machine which handles hot glass containers.

BACKGROUND OF THE INVENTION

In the glass container manufacturing industry, glass containers intended to contain beverages or food products are molded and exit the molds very hot. After the glass containers are molded, they are typically placed on a glass container conveyor for further handling. It becomes necessary to move glass containers from one conveyor to another in the manufacturing process. Devices generally referred to as lehr loader bars, push bars or stacker bars are utilized to move the glass containers from one conveyor to another and for other purposes as well.

The high temperature of the glass containers, combined with the inherent nature of the glass comprising the glass containers, make them susceptible to cracking. For instance, if the glass containers exiting the glass container molds come in direct contact with metal, the rapid heat transfer from the glass container to the contacting metal generally results in unacceptable marking or cracking of the glass container. These blemishes are sometimes referred to in the industry as "checks".

In order to greatly reduce or eliminate the unacceptable incidents of checking, insulators are generally placed between the glass container and anything the glass container may come in contact with. The insulators generally used in the industry are comprised of a material referred to as carbon-carbon composite. The carbon-carbon composite is generally fabricated by layering two dimensional carbon fiber fabric together to a desired thickness, and then utilizing a carbon vapor deposition technique with a gas to fill the voids and bond the carbon fiber fabric layers together.

The pushbars generally push a group of glass containers transversely passing by on a first conveyor to a second and perpendicular conveyor, which generally moves the glass containers through an annealing lehr. Once a group of glass containers has been pushed to the second conveyor, the pushbar is raised, retracted back into position above the first conveyor and then lowered into position to push the next group of glass containers from the first conveyor to the second conveyor and into the annealing lehr. The first conveyor has only one row of glass containers moving transverse to the pushbar, whereas the second conveyor moves approximately perpendicular to the first conveyor and has multiple rows and columns of bottles moving at a slower rate.

In order to assist in controlling the movement of the glass containers from the first to the second conveyor, and their placement or positioning on the second conveyor, the pushbars include insulator support assemblies or guides (also known in the industry as insert holders, stacker bar holders or insulator holders) mounted spaced distances apart from one another. Between adjacent pushbar retainers is a recessed or pocket area into which the glass containers on the first conveyor are preferably located while being pushed on to the second conveyor, which results in the glass containers being placed in the desired locations on the second conveyor and through the annealing lehr.

There is typically one pushbar operating on each glass container production line and multiple production lines per production facility. If there is a malfunction or problem requiring a pushbar to be serviced, fixed or maintained, the entire production line continues to run with all of the glass containers going down the scrap chute until the problem is fixed. It is therefore critical that the pushbars and assemblies have a very minimal number of down time incidents and that the amount of time down per incident is minimized and the number of scrapped containers is minimized.

Figure 1:
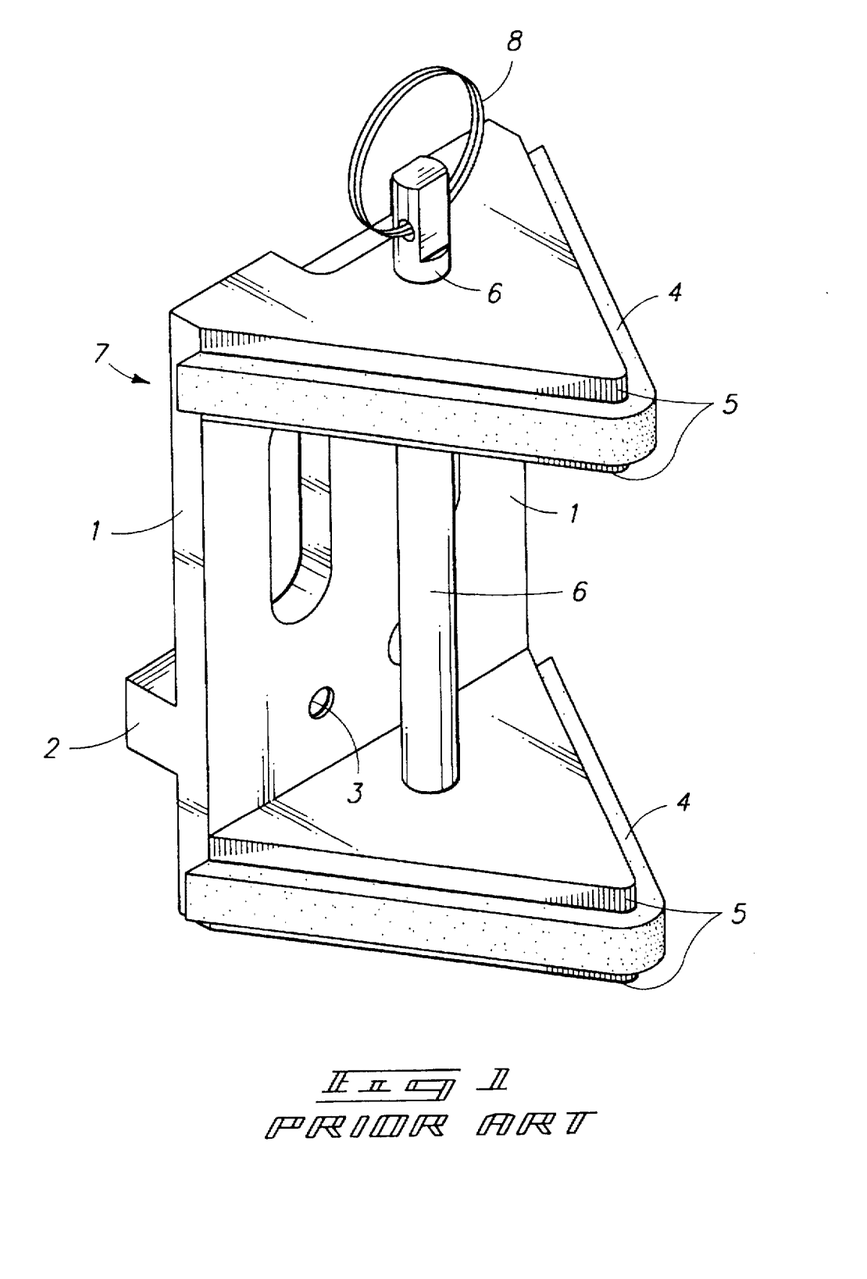
FIG. 1 is a frontal perspective view of a prior art insulator support assembly.

The predominant insulator support assembly used in the glass container manufacturing industry is shown in FIG. 1. The insulator support 7 includes rearward frame support 1, a step 2 or ridge on the frame to position the insulator support assembly 7 relative to the pushbar. The step 2 typically fits within a slot down the pushbar and bolts inserted through hole 3 engage a clamping mechanism which fixes the insulator support to the pushbar. There is no fixed hole in the pushbar or location on the pushbar to which replacement insulator supports can be readily positioned and fixed.

The insulators 4 are inserted between horizontal frame sections 5 and held into place by pin 6. Pin 6 is typically held into place by ring 8 and a cotter key positioned elsewhere through pin 6. Frame 1 is typically manufactured by casting.

A common problem which causes substantial downtime on the glass container production lines occurs when the pushbar, with guides thereon, returns from the second conveyor to the first conveyor in the raised position, and is lowered into position relative to the newly positioned glass containers on the first conveyor. The glass containers on the first conveyor are not always properly positioned relative to the pushbar guides, and when the pushbar is lowered into position, the pushbar guides are sometimes lowered right onto the top of one or more glass containers on the first conveyor.

The prior art glass container guide illustrated in FIG. 1 tends to unacceptably bend or fail when lowered on glass containers due to the lack of support between horizontal frame sections 5. It is the horizontal frame sections 5 of the prior art pushbar guides that tend to bend or break with unacceptably high frequency.

Furthermore, when one of the prior art glass container guides 7 fails, it is not easily and quickly replaceable on the entire pushbar. The prior art glass container guides 7 must be individually bolted on and repositioned by measuring the exact location where the replacement must be and therefore the installation of a replacement guide requires that the distances from the adjacent guides be precisely measured and then the necessary holes can be drilled and the guide installed. The prior art glass container guides 7 can be relatively difficult to access from the front side and their failure results in unacceptably high periods of downtime for the assembly.

Despite the longstanding recognition of the forenamed problems and the long felt need for a solution, there has not heretofore been a sufficient solution devised to remedy the problems.

It is an object of this invention to provide a pushbar and pushbar assembly for the handling of beverage glass containers, which greatly reduces the number of incidents of downtime of the glass container production line. This invention accomplishes this object by providing a frame of sufficient strength and toughness that it will withstand the impact of hitting the top(s) of glass containers on the first conveyor without bending or breaking. Instead, the glass container(s) being impacted will break, which merely requires some cleanup instead of shutting the line down for a longer period of time.

It is a further object of this invention to provide a pushbar and pushbar assembly for the handling of beverage glass containers, which greatly minimizes the actual time the glass container production line is down or inoperable, per incident of downtime. This invention accomplishes this object by providing an attachable and detachable mounting system which allows one or more pushbar assemblies to be quickly and easily removed and replaced with the quick change pin system provided by this invention.

It has been another known, but unsolved problem, that due to the normal vibration of the pushbar assembly, the bolts used by the prior art to bolt the pushbar assembly to the pushbar, vibrate loose. The loosening of the bolts either requires additional maintenance of the pushbars, and consequently more downtime, or alternatively, results in a failure, which also results in more downtime.

It is a still further object of this invention to more securely fasten the pushbar assemblies to the pushbar such that the vibration of the pushbar will not result in loosening of the means of attachment. This invention accomplishes this object by providing a saddle mounting system, with an attachment bar which penetrates the pushbar and is attachable and detachable thereto with the quick change pin system provided by this invention. The locking mechanism to secure the pushbar assembly to the pushbar, not only allows for maintenance free attachment, but also allows the pushbar assembly to be easily and quickly attached and detached to and from the pushbar.

BRIEF DESCRIPTION OF THE DRAWINGS

Preferred embodiments of the invention are described below with reference to the accompanying drawings, which are briefly described below.

FIG. 3 is a top view of the insulator support shown in FIG. 2;

FIG. 4 is a back view of the insulator support shown in FIG. 2;

FIG. 6 is a bottom view of one embodiment of a pushbar with multiple insulator support assemblies provided by this invention;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection and other means and components utilized in this invention are widely known and used in the field of the invention described, their exact nature or type is not necessary for an understanding and use of the invention by a person skilled in the art or science, and they will not therefor be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefor be discussed in significant detail.

The term "tubular" as used herein is used in a much broader way than its dictionary definition. While the term "tubular" as used in the dictionary may mean a hollow and cylindrical component, it is not so limited in its use in this invention. Tubular as used herein includes, without limitation, a hollow bodied component of any cross-sectional shape or configuration, and which need not be continuously hollow or shaped throughout its entire length. FIG. 1 is an example of the prior art and is described more fully above.

Figure 2:
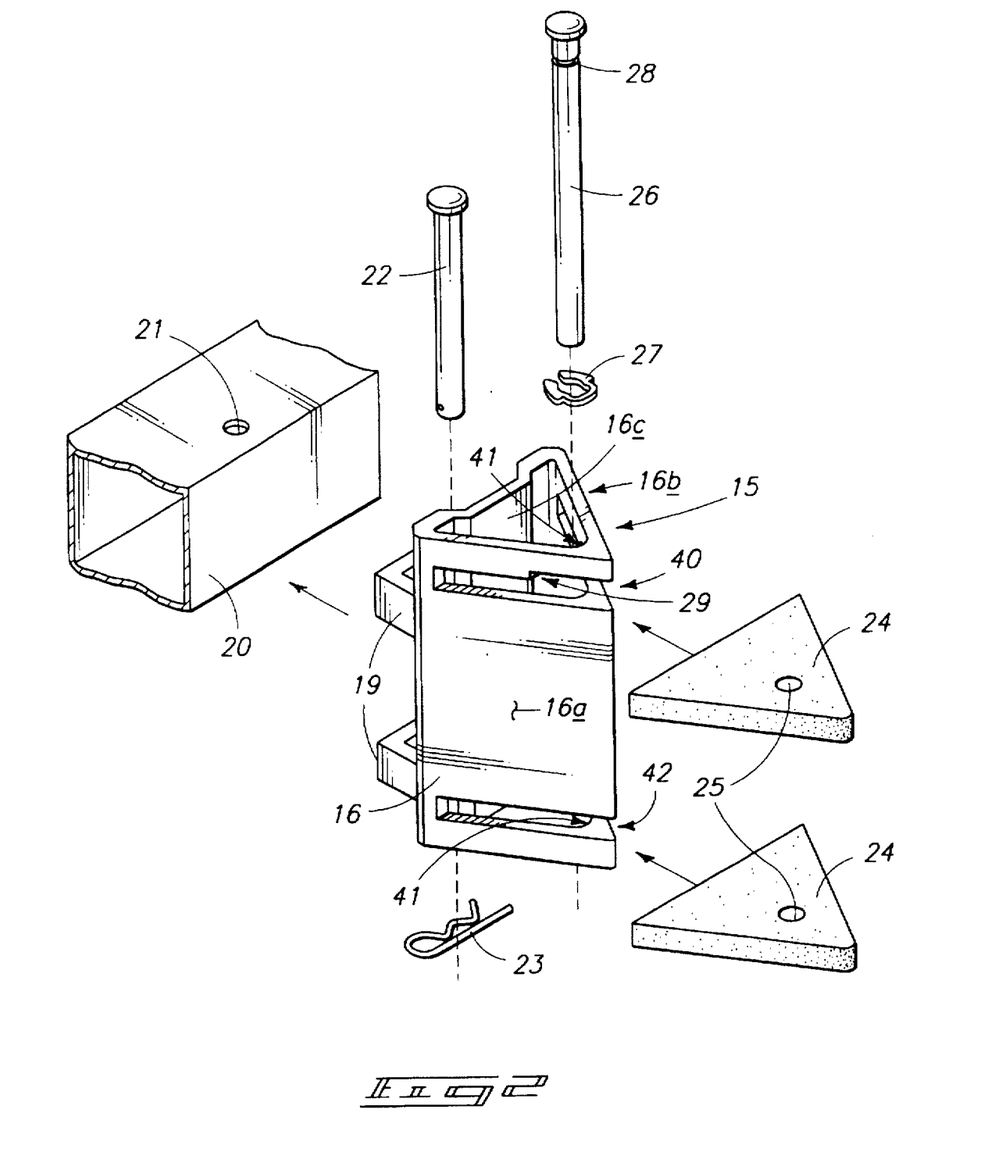
FIG. 2 is a frontal perspective view of one embodiment of the pushbar assembly provided by this invention, including an insulator support assembly exploded to illustrate the components.

FIG. 2 is an exploded perspective view of one embodiment of the insulator support assembly provided by this invention, illustrating the frame and the various other components. The frame 16 of the insulator support assembly 15 illustrated in FIG. 2 is generally triangular in cross-section, with frame sides 16a, 16b and rearward frame support 16c, the frame sides 16a, 16b and the rearward frame support 16c forming an internal cavity.

In the embodiment of the frame 16 illustrated in FIG. 2, the frame 16 lends itself to be relatively easily extruded, with minimal machining then being required to finalize the part. The frame includes a first insulator support 40 and a second insulator support 42, each of which receives and provides at least some of the support for an insulator 24.

In the example embodiment of the invention shown in FIG. 2, there are two insulator supports 40 & 42 shown as apertures or slots machined into the frame 16, but the invention is not limited to such. First, the invention may include only one insulator support and consequently only one insulator. Second, the insulator support need not be an aperture or slot, but instead could any one of a number of other supports which retain the insulator into the desired approximate location.

The insulators 24 are located in the first and second insulator supports 40 & 42 and vertically oriented insulator attachment pin 26 is then placed against radius 41 in the internal portion of the frame 16, and through holes 25 in the insulators 24. Slit 29 is cut into the frame 16 so that retaining ring 27 can be placed over groove 28 when insulator attachment pin 26 is in place in the frame. This serves to allow for quick and easy attachment and detachment of the insulators 24 to and from the frame 16.

The invention includes a pushbar mounting mechanism which facilitates the attachment of the frame to the pushbar mechanism. The pushbar mounting mechanism, within the scope of this invention, can be as simple as two holes through the rearward frame support 16c which correspond to two holes in the pushbar mechanism and bolts placed through the corresponding holes. The mechanism of corresponding holes in the rearward frame support 16c and the pushbar mechanism is used on the terminal or end insulator support member 60, as shown in FIGS. 6–10.

The preferred pushbar mounting mechanism for the insulator support assemblies is a mounting saddle 19 which fits around the pushbar mechanism 20 and serves to properly locate the frame 16 on the pushbar mechanism 20 and to assist in the securement of the frame 16 to the pushbar mechanism 20. The pushbar mounting mechanism can also include a first mount leg with an aperture and a second mount leg with an aperture with the first mount leg and the second mount leg disposed to mount around two opposing sides of the pushbar mechanism 20, such that the aperture in the first mount leg, the aperture in the second mount leg, and an aperture in the pushbar mechanism are substantially aligned to receive an insulator support assembly mount pin 22 for mounting the assembly to the pushbar mechanism 20.

When it is stated that the pushbar mounting mechanism as contemplated by this invention is integral to the rearward frame support 16c, integral is used in its broadest extent in that the mounting mechanism can be one piece or part of the frame, or it can be one or more separate components attached to the frame when the insulator support mechanism is attached to the pushbar mechanism.

The insulator support assembly 15 is connected to pushbar mechanism 20 by placing the opposing members of the mounting saddle 19 around the pushbar mechanism 20, aligning the corresponding holes, i.e. hole 21 in the pushbar mechanism 20, with holes in the back portion of insulator support assembly 15. It should be noted that hole 21 is contained on both sides of the pushbar mechanism such that insulator support assembly mount pin 22 can be inserted all the way through the pushbar mechanism 20.

Insulator support assembly mount pin 22 is then placed through the corresponding holes in the pushbar mechanism 20 and the insulator support assembly 15, and a cotter key 23 is then placed through insulator support assembly mount pin 22 to retain it in place.

The insulator support assembly mount pin 22 and cotter key 23 arrangement makes it much quicker to attach and detach individual insulator support assemblies 15 to the pushbar mechanism 20, thereby minimizing down time.

FIG. 3 is a top view of the insulator support assembly shown in FIG. 2, without insulator support assembly mount pin 22 and insulator attachment pin 26. FIG. 3 illustrates the tubular and triangular shape of this embodiment of the invention, showing frame sides 16a, 16b and rearward frame support 16c.

FIG. 3 further illustrates frame hole 44 through which insulator support assembly mount pin 22 passes before it penetrates hole 21 in pushbar mechanism 20. Hole 25 in the insulator 24, through which insulator attachment pin 26 passes, is also shown, along with the radius 41 in the frame.

FIG. 4 is a back view of the insulator support assembly shown in FIG. 2, showing rearward frame support 16c of frame 16, insulators 24 and mounting saddle 19. Further shown in FIG. 4 is the mounting mechanism hole 33, through which a bolt can be placed to mount the insulator support assembly to the pushbar mechanism. In the preferred embodiment, the endpiece 60 insulator support assembly as shown in FIGS. 6–10, is mounted by bolting it to the pushbar mechanism 20 with a bolt through mounting mechanism hole 33. Likewise in the preferred embodiment, the other insulator support assemblies 15 are mounted by using the insulator support assembly mount pin 22 through hole 21.

Figure 5:
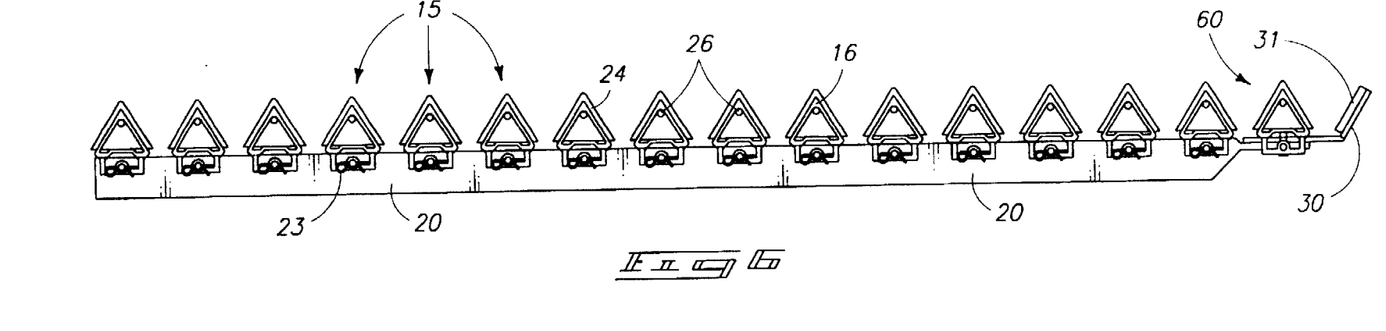
FIG. 5 is a side view of the insulator support shown in FIG. 2.

FIG. 5 is a side view of the insulator support assembly shown in FIG. 2, illustrating the insulators 24, frame side 16a, rearward frame support 16c, and mounting saddle 19 for mounting the insulator support assembly 15 on a pushbar.

FIG. 6 is a top view of one embodiment of an entire insulator support with multiple insulator support assemblies provided by this invention. In a typical embodiment of a pushbar mechanism 20, or lehr bar, sixteen insulator support assemblies 15 are mounted thereon, as illustrated in FIG. 6.

FIG. 6 further illustrates that at the end of the pushbar, insulator 31 is mounted on pushbar endpiece 30.

Figure 7:
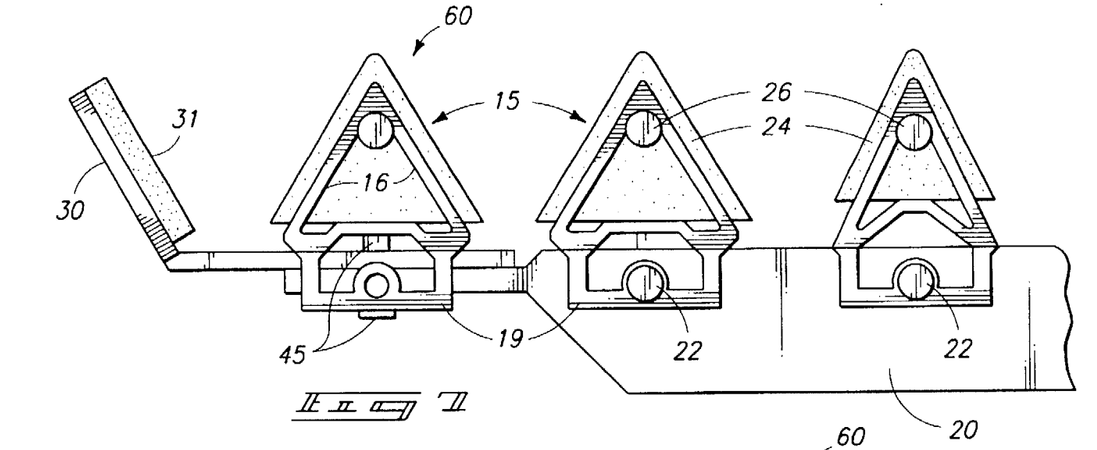
FIG. 7 is a top view of one embodiment of a partial pushbar with multiple insulator support assemblies provided by this invention.

FIG. 7 is a partial top view of one embodiment of a insulator support with multiple insulator support assemblies provided by this invention. FIG. 7 illustrates the pushbar endpiece 30 with insulator 31 mounted thereon, and further illustrates insulator attachment pin 26 in position penetrating through the hole 25 in the insulators 24.

FIG. 7 further shows that the insulator support assembly 15 nearest the endpiece 30 is bolted on using two bolts 45, which penetrates the endpiece 30 and into frame 16. The last or end insulator support does not have a insulator support assembly mount pin 22 to secure it to the pushbar, but instead is secured thereto by bolting.

Figure 8:
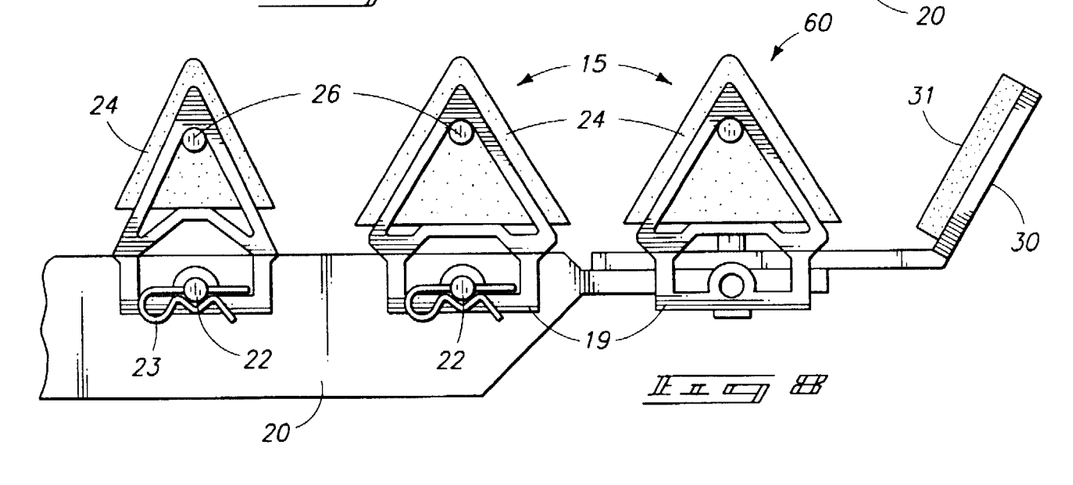
FIG. 8 is a bottom view of one embodiment of a partial pushbar with multiple insulator support assemblies provided by this invention.

FIG. 8 is a bottom view of one embodiment of a insulator support with multiple insulator support assemblies provided by this invention, and illustrates the cotter pins 23 through insulator support assembly mount pin 22, securing the insulator support assemblies 15 to the pushbar mechanism 20.

Figure 9:
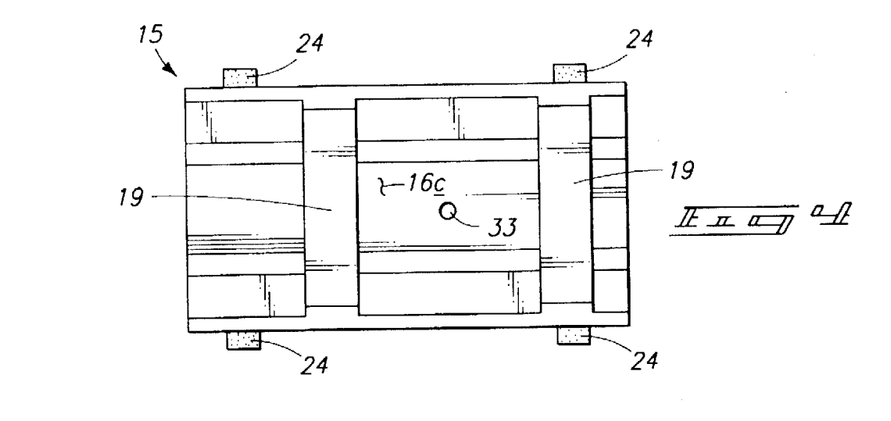
FIG. 9 is a back elevation view of one embodiment of a partial pushbar with multiple insulator support assemblies provided by this invention.

FIG. 9 is a back view of one embodiment of a insulator support with multiple insulator support assemblies 15 provided by this invention, illustrating the pushbar mechanism 20, endpiece 30, the bolts securing the insulator support assembly closest to the endpiece 30 to the pushbar mechanism 20.

Figure 10:
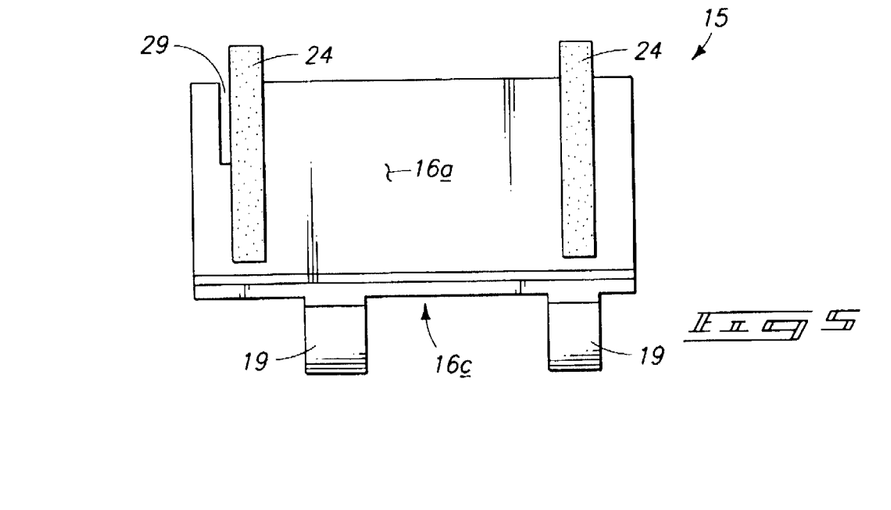
FIG. 10 is a front elevation view of one embodiment of a partial pushbar with multiple insulator support assemblies provided by this invention.

FIG. 10 is a front elevation view of one embodiment of a insulator support assembly with multiple insulator support assemblies 15 provided by this invention, showing frame sides 16a & 16b, slit 29 wherein retaining ring 27 is inserted around insulator attachment pin 26 to secure it and the insulators 24 into the insulator support assembly 15.

Figure 11:
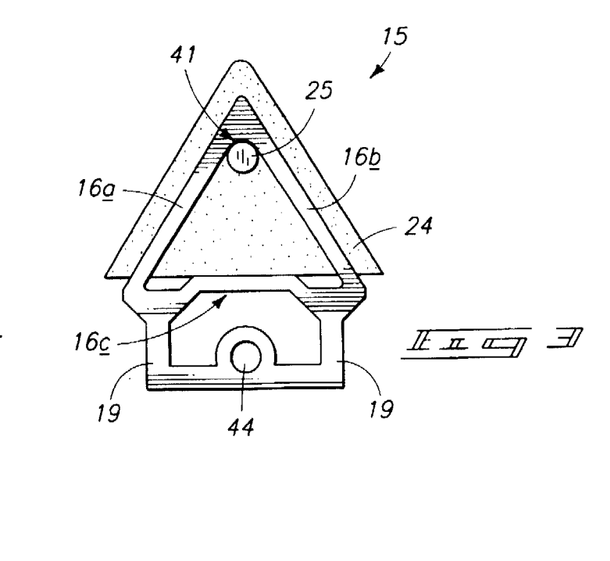
FIG. 11 is a top view of one alternative embodiment of a pushbar assembly provided by this invention, wherein the cross section of the frame of the insulator support assembly is semicircular instead of triangular.

FIG. 11 is a top view of an alternative embodiment of a insulator support assembly provided by this invention, wherein the cross section of the frame is generally in the shape of a semicircle instead of a triangle. Since the specific shape of the frame is not necessary to practice this invention, it could be square, rectangular, circular, elliptical or any other specific cross-sectional shape or configuration, within the contemplation of this invention.

It is the preferred method to manufacture the insulator support assembly generally by extruding and machining the frame and then assembling the other components to the frame. However, it may also be possible to mold the frame by known methods, such as injection molding or investment cast process, to name a few.

The first step of the process is to extrude a tubular frame, in which one tubular frame side is a rearward frame support. The frame can be extruded by normal known processes in any one of a number of different shapes and configurations.

two examples of which are shown in FIGS. 2 & 11. No one specific shape or configuration is necessary to practice this invention.

The next step is to providing a pushbar mounting mechanism integral to the rearward frame support, with one or more holes corresponding to the holes in the pushbar mechanism. There can be one or more holes configured and located to mount each insulator support assembly and the holes can be partially or wholly through the pushbar mechanism. If the insulator support mechanism is to be mounted by screwing it on. a bolt can be inserted through mount mechanism hole 33 and into a corresponding threaded hole in the pushbar mechanism 20.

The next step is to machine two horizontal or transverse apertures 40 or slots into the tubular frame, and then to provide and mount two insulators into the two horizontal or transverse apertures in the tubular frame. Mounting two insulators into the two horizontal or transverse apertures in the tubular frame can be accomplished by: providing an insulator attachment pin; providing the two insulators with corresponding holes through each; inserting the two insulators into the horizontal or transverse apertures such that the corresponding holes are located within the tubular frame; orienting insulator attachment pin approximately parallel to the longitudinal axis of the frame and within the tubular frame; inserting the insulator attachment pin through the corresponding holes in the insulators within the tubular frame; and then placing a retaining mechanism on the insulator attachment pin to retain it in position through the corresponding holes in the insulators and within the tubular frame.

The next step is to provide a pushbar mechanism and then mount the tubular frame to the pushbar mechanism. The tubular frame can be mounted to the pushbar mechanism by: providing an insulator support assembly mount pin; locating the holes in the pushbar mounting mechanism adjacent the desired corresponding holes in the pushbar mechanism; inserting the insulator support assembly mount pin through the corresponding holes in the pushbar mounting mechanism and in the pushbar mechanism; and then placing a retaining mechanism on the insulator support assembly pin to retain it in position through the corresponding holes in the pushbar mounting mechanism and in the pushbar mechanism.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An insulator support assembly for use with a pushbar mechanism for moving glass containers, comprised of:
   (a) a vertically oriented tubular frame with an internal cavity and at least one insulator support, said at least one insulator support disposed to receive and support at least one horizontally oriented insulator;
   (b) at least one horizontally oriented insulator corresponding to and supported by the at least one insulator support and extending into said internal cavity; and
   (c) a pushbar mounting mechanism integral to the frame, and disposed to mount the frame to a pushbar mechanism.

2. An insulator support assembly as recited in claim 1, and in which the at least one horizontally oriented insulator includes an aperture disposed to receive a vertically oriented insulator attachment pin passing through the internal cavity of the frame, and further comprising said insulator attachment pin inserted through the aperture in the at least one horizontally oriented insulator and through the internal cavity of the frame.

3. An insulator support assembly as recited in claim 1, and in which the at least one insulator support is further comprised of:
   (a) a horizontal aperture in the frame. said horizontal aperture disposed to receive the at least one insulator; and
   (b) a vertically oriented insulator attachment pin inserted through an aperture in the at least one insulator and through the internal cavity of the frame.

4. An insulator support assembly as recited in claim 3, and in which there are two horizontal apertures and two insulators corresponding to and supported by the two horizontal apertures.

5. An insulator support assembly as recited in claim 1, and in which the pushbar mounting mechanism further comprises:
   (a) a mounting saddle integral to the frame and disposed to mount over opposing sides of a pushbar mechanism; and
   (b) an insulator support assembly mount pin inserted through an aperture in the mounting saddle and through the pushbar mechanism.

6. An insulator support assembly as recited in claim 1, and in which the pushbar mounting mechanism further comprises a first mount leg with an aperture and a second mount leg with an aperture, the first mount leg and the second mount leg disposed to mount around two opposing sides of the pushbar mechanism, such that the aperture in the first mount leg and the aperture in the second mount leg are substantially aligned.

7. An insulated pushbar mechanism for moving glass containers, comprised of:
   (a) a horizontally oriented pushbar with a plurality of holes spaced apart from one another;
   (b) a plurality of insulator support assemblies each comprised of:
      i. a vertically oriented tubular frame with an internal cavity and at least one insulator support, said at least one insulator support disposed to receive and support at least one horizontally oriented insulator;
      ii. at least one horizontally oriented insulator corresponding to and supported by the at least one insulator support and extending into said internal cavity; and
      iii. a pushbar mounting mechanism integral to the frame, and disposed to mount the frame to the pushbar.

8. An insulated pushbar mechanism as recited in claim 7, and in which the at least one horizontally oriented insulator includes an aperture disposed to receive a vertically oriented insulator attachment pin passing through the internal cavity of the frame, and further comprising said insulator attachment pin inserted through the aperture in the at Least one insulator and through the internal cavity of the frame.

9. An insulated pushbar mechanism as recited in claim 7, and in which each insulator support is further comprised of:

(a) at least one horizontal aperture in the frame, said at least one horizontal aperture disposed to receive the at least one horizontally oriented insulator; and (b) a vertically oriented insulator attachment pin inserted through an aperture in the at least one horizontally oriented insulator and through the internal cavity of the frame.

10. An insulated pushbar mechanism as recited in claim 7, and in which each insulator support assembly includes two insulator supports and two horizontally oriented insulators corresponding to and supported by the two insulator supports.

11. An insulated pushbar mechanism as recited in claim 7, and in which the pushbar mounting mechanism which is integral to the frame further comprises:

(a) a mounting saddle integral to the frame and disposed to mount over opposing sides of the pushbar; and (b) an insulator support assembly mount pin inserted through an aperture in the mounting saddle and through the pushbar.

12. An insulator support assembly as recited in claim 7, and in which the pushbar mounting mechanism further comprises a first mount leg with an aperture and a second mount leg with an aperture, the first mount leg and the second mount leg disposed to mount around two opposing sides of the pushbar, such that the aperture in the first mount leg, the aperture in the second mount leg, and one of the plurality of holes in the pushbar, are substantially aligned, and further comprising an insulator support assembly mount pin inserted through the aperture in the first mount leg, through said one of the plurality of holes in the pushbar, and through the aperture in the second mount leg so as to mount the insulator support assembly to the pushbar.

* * * * *